United States Patent
Gao et al.

(10) Patent No.: US 11,561,544 B2
(45) Date of Patent: Jan. 24, 2023

(54) INDOOR MONOCULAR NAVIGATION METHOD BASED ON CROSS-SENSOR TRANSFER LEARNING AND SYSTEM THEREOF

(71) Applicant: Harbin Institute of Technology, Heilongjiang (CN)

(72) Inventors: Huijun Gao, Heilongjiang (CN); Zhan Li, Heilongjiang (CN); Xidi Xue, Heilongjiang (CN); Weichao Sun, Heilongjiang (CN); Xuebo Yang, Heilongjiang (CN); Xinghu Yu, Heilongjiang (CN)

(73) Assignee: HARBIN INSTITUTE OF TECHNOLOGY, Heilongjiang (CN)

( * ) Notice: Subject to any disclaimer, the term of this patent is extended or adjusted under 35 U.S.C. 154(b) by 320 days.

(21) Appl. No.: 16/931,653

(22) Filed: Jul. 17, 2020

(65) Prior Publication Data
US 2021/0333793 A1    Oct. 28, 2021

(30) Foreign Application Priority Data
Apr. 24, 2020    (CN) .......................... 202010330835.9

(51) Int. Cl.
G05D 1/00     (2006.01)
G01S 17/931   (2020.01)
(Continued)

(52) U.S. Cl.
CPC ......... G05D 1/0088 (2013.01); G01C 21/206 (2013.01); G01S 17/89 (2013.01); G01S 17/931 (2020.01); G05D 1/0221 (2013.01)

(58) Field of Classification Search
CPC .. G05D 1/0088; G05D 1/0221; G01C 21/206; G01C 21/005; G01S 17/89; G01S 17/931; G06N 3/0454; G06N 3/08
See application file for complete search history.

(56) References Cited

U.S. PATENT DOCUMENTS

2018/0088597 A1* 3/2018 Shen ..................... G01C 21/20

OTHER PUBLICATIONS

Z Chen, R. Khemmar, B. Decoux, A. Atahouet and J. Ertaud, "Real Time Object Detection, Tracking, Distance and Motion Estimation based on Deep Learning:Application to Smart Mobility," 2019 Eighth International Conference on Emerging Security Technologies (EST), 2019, pp. 1-6, doi: 10.1109/EST.2019.8806 (Year: 2019).*

(Continued)

*Primary Examiner* — Marthe Y Marc-Coleman
(74) *Attorney, Agent, or Firm* — McDonnell Boehnen Hulbert & Berghoff LLP

(57) ABSTRACT

The present disclosure relates to an indoor monocular navigation method based on cross-sensor transfer learning and a system thereof. Determining a preliminary autonomous navigation model according to simulated laser radar data; acquiring actual single-line laser radar data and monocular camera data of the mobile robot simultaneously in an actual environment; determining the heading angle of the mobile robot according to the actual laser radar data; determining a laser radar monocular vision navigation model, according to the generated heading angle of the mobile robot and the monocular camera data at a the same moment and by using a Resnet18 network and a pre-trained YOLO v3 network; determining a heading angle of the mobile robot at the current moment, according to the acquired monocular camera data and by using the laser radar monocular vision navigation model; performing navigation of the mobile robot.

8 Claims, 4 Drawing Sheets

(51) Int. Cl.
*G01C 21/20* (2006.01)
*G01S 17/89* (2020.01)
*G05D 1/02* (2020.01)

(56) References Cited

OTHER PUBLICATIONS

Real-Time Onboard 3D State Estimation of an Unmanned Aerial Vehicle in Multi-Environments Using Multi-Sensor Data Fusion; Du, Hao; Wang, Wei; Xu, Chaowen; Xiao, Ran; Sun, Changyin. Sensors; Basel vol. 20, Iss. 3, (2020): 919. DOI:10.3390/s20030919 (Year: 2020).*

* cited by examiner

INDOOR MONOCULAR NAVIGATION METHOD BASED ON CROSS-SENSOR TRANSFER LEARNING AND SYSTEM THEREOF

CROSS-REFERENCE TO RELATED APPLICATION

The present application claims priority to China Patent Application No. 202010330835.9 filed Apr. 24, 2020, the disclosure of which is hereby incorporated by reference in its entirety.

TECHNICAL FIELD

The present disclosure relates to the field of indoor visual navigation, in particular to an indoor monocular navigation method based on cross-sensor transfer learning and a system thereof.

BACKGROUND

Mobile robots such as unmanned aerial vehicles and autonomous vehicles bring great convenience for human society. For example, unmanned aerial vehicles, initially in experimental trials and civil aerial photography, and more recently in autonomous navigation and even distributed positioning and modeling, have greatly improved people's work efficiency. Mobile robots, especially small-sized unmanned aerial vehicles and autonomous vehicles, have the characteristics of small space and high maneuverability and thus can more conveniently perform tasks in indoor and similar complex environments. Therefore, if a mobile robot is capable of autonomous intelligent navigation in a complex unknown indoor environment, its range of application can be greatly expanded. However, the research and development of indoor autonomous navigation algorithms of mobile robots have faced great challenges: since the invention of indoor autonomous navigation algorithms, they have been having troubles with achieving self-adaptive stable navigation when the environment structure is undetermined, the lighting is unstable, and the indoor pedestrians differ largely in form or walk in random directions, which is one of the difficulties in the field of autonomous navigation of mobile robots such as unmanned aerial vehicles and autonomous vehicles. Therefore, it is of great significance to study an autonomous navigation method in an indoor environment.

Due to long-term evolution of the organisms in nature, environmental variations repeatedly strengthen the adaptability of the organisms to the environment. Biological scientific research shows that an organism adapts to an environment by continuously interacting with the environment and acquiring feedbacks from the environment, which continuously strengthens a certain capability of the organism. For example, in the case of walking, hunting, group movement of an animal, the animal constantly improves and elevates its decision strategy through a continuous trial and error process. This type of learning also belongs to the category of evolution, and is characterized in that it does not involve precise modeling and is continuously improved only through continuous interaction with the environment and acquiring a reward or penalty from the environment. As an example, unmanned aerial vehicles can learn their autonomous navigation capabilities in an unknown environment by this type of learning method. In this process, the unmanned aerial vehicle can be compared to an organism, and its continuous trial and error process can be compared to an organism's learning process. As the organism can acquire feedbacks from the natural world, the unmanned aerial vehicle can be excited to adapt to the environment faster by artificially set reward and penalty that are beneficial to the autonomous navigation of the unmanned aerial vehicle. This is also the basic idea of reinforcement learning. It can be seen that reinforcement learning belongs to end-to-end learning; with an input environment state, a decision action is output directly.

At present, according to whether path planning is based on a trajectory method, mobile robot navigation algorithms can be divided into two categories, namely a trajectory planning-based method and an action response-based (end-to-end decision) method. For the trajectory planning-based method, the method has the advantages that by dynamic planning, a global optimal path can be obtained, and the result is more controllable and more stable; however, the method has the disadvantages that the algorithm is long in time and heavily relies on the calculation resource of the computer, in addition, the trajectory planning-based method normally has a relatively low generalization capability. For the action response-based method, an advantage of such method is that it is an end-to-end decision-type algorithm which is generally shorter in its decision-making time-consuming, and currently end-to-end-based algorithms normally have a better generalization capability; however, end-to-end methods have an apparent drawback: the decision is not necessarily a global optimal solution.

Action response-based navigation algorithms can further be divided into an autonomous learning category and a non-autonomous learning category. Non-autonomous learning algorithms include the artificial potential field method; however, it may cause local oscillation when the mobile robot is too close to an obstacle or too far away from the target position, and even subsequent improved version of the artificial potential field method has the problem that its parameters are difficult to set, which all make a practical application nearly unfeasible. Autonomous learning robot navigation algorithms currently include deep reinforcement learning based and deep learning based methods. Currently successful cases where deep reinforcement learning is used for indoor navigation include Generalization through Simulation Integrating Simulated and Real Data into Deep Reinforcement Learning for Vision Based Autonomous Flight (GTS), which is an end-to-end decision method for mobile robot indoor navigation.

However, with regard to this deep reinforcement learning (GTS) navigation algorithm, firstly, it uses a state value estimation network trained from a simulation environment and evaluates all actions one by one in an action space by using the state value estimation network, resulting in an increased response delay when the decision is made; secondly, it uses a discrete action space, which leads to discrete decision actions and unsmooth actions; finally, the method (GTS) migrates the network trained by a simulation environment to an actual physical mobile robot, resulting in insufficient navigation margin and unstable path due to an overly simplified network model.

At present, monocular end-to-end mobile robot navigation algorithms are almost all tested in an environment with no people because depth information is hard to get with monocular cameras; and, pedestrians move randomly and like to gather and watch, which greatly reduces the applicability of this type of algorithms or even makes it unusable.

SUMMARY OF PARTICULAR EMBODIMENTS

An object of the present disclosure is to provide an indoor monocular navigation method based on cross-sensor transfer learning and a system thereof, to improve the accuracy of mobile robot navigation with a monocular camera.

In order to achieve the object above, the present disclosure provides the following technical solutions:

An indoor monocular navigation method based on cross-sensor transfer learning includes:
acquiring simulation single-line laser radar data of a mobile robot in a simulation model, where the simulation model is built in a Webots open source simulation environment; the mobile robot is a DJI Mavic Pro; the mobile robot is provided with an LMS 291 single-line laser radar; the simulation single-line laser radar data is a depth value;
determining an autonomous navigation model according to the simulation single-line laser radar data and by using a deterministic policy gradient deep reinforcement learning method, where the autonomous navigation model takes the laser radar data as an input and outputs a heading angle of the mobile robot;
acquiring actual single-line laser radar data and monocular camera data of the mobile robot at the same moment in an actual environment;
determining a heading angle of the mobile robot according to the actual single-line laser radar data and by using the autonomous navigation model;
determining a laser radar monocular vision navigation model, according to the heading angle of the mobile robot at the same moment and monocular camera data at a corresponding moment and by using a Resnet18 network and a pre-trained YOLO v3 network, where the laser radar monocular vision navigation model takes the monocular camera data as an input, and outputs a heading angle at a corresponding moment;
acquiring monocular camera data to be determined;
determining a heading angle of the mobile robot at a current moment, according to the monocular camera data to be determined and by using the laser radar monocular vision navigation model;
performing navigation of the mobile robot according to the heading angle at the current moment.

Optionally, the determining an autonomous navigation model according to the simulation single-line laser radar data and by using a deterministic policy gradient deep reinforcement learning method may include: using $R=-k \cdot d_{min}^{-1}+R_p$ for determining a reward function, where R is the reward function; k is a constant, with a value of 0.5; $d_{min}$ is a safety margin of the current mobile robot; $R_p$ is a dynamic performance excitation item for the current mobile robot, $$R_p = \begin{cases} -0.3 & \text{if } v \approx 0 \\ +0.4 & \text{if } v \neq 0 \text{ and } w \neq 0 \\ +0.1 & \text{else} \end{cases},$$

where v is a linear velocity and w is an angular velocity.

Optionally, the determining a laser radar monocular vision navigation model, according to the heading angle of the mobile robot at the same moment and monocular camera data at a corresponding moment and by using a Resnet18 network and a pre-trained YOLO v3 network may include:
labeling the monocular camera data according to the heading angle of the mobile robot at the same moment, to obtain a sample image.

Optionally, the determining a laser radar monocular vision navigation model, according to the heading angle of the mobile robot at the same moment and monocular camera data at a corresponding moment and by using a Resnet18 network and a pre-trained YOLO v3 network further may include:
acquiring a Resnet18 network and a pre-trained YOLO v3 network;
inputting the sample image to the Resnet18 network and the pre-trained YOLO v3 network; merging pedestrian information vectors output by the pre-trained YOLO v3 network with a fully connected layer of the Resnet18 network, to obtain a laser radar monocular vision navigation model.

An indoor monocular navigation system based on cross-sensor transfer learning is also provided, including:
a first acquisition module, configured to acquire simulation single-line laser radar data of a mobile robot in a simulation model, where the simulation model is built in a Webots open source simulation environment; the mobile robot is a DJI Mavic Pro; the mobile robot is provided with an LMS 291 single-line laser radar; the simulation single-line laser radar data is a depth value;
an autonomous navigation model determination module, configured to determine an autonomous navigation model according to the simulation single-line laser radar data and by using a deterministic policy gradient deep reinforcement learning method, where the autonomous navigation model takes the laser radar data as an input and outputs a heading angle of the mobile robot;
a second acquisition module, configured to acquire actual single-line laser radar data and monocular camera data of the mobile robot at the same moment in an actual environment;
a mobile robot heading angle determination module, configured to determine a heading angle of the mobile robot according to the actual single-line laser radar data and by using the autonomous navigation model.
a laser radar monocular vision navigation model determination module, configured to determine a laser radar monocular vision navigation model, according to the heading angle of the mobile robot at the same moment and monocular camera data at a corresponding moment and by using a Resnet18 network and a pre-trained YOLO v3 network, where the laser radar monocular vision navigation model takes the monocular camera data as an input, and outputs a heading angle at a corresponding moment;
a third acquisition module, configured to acquire monocular camera data to be determined
a mobile robot current moment heading angle determination module, configured to determine a heading angle of the mobile robot at a current moment, according to the monocular camera data to be determined and by using the laser radar monocular vision navigation model;
a navigation module, configured to perform navigation of the mobile robot according to the heading angle at the current moment.

Optionally, the autonomous navigation model determination module may include: a reward function determination unit, configured to determine a reward function by using $R=-k \cdot d_{min}^{-1}+R_p$, where R is the reward function; k is a constant, with a value of 0.5; $d_{min}$ is a safety margin of the current mobile robot; $R_p$ is a dynamic performance excitation item for the current mobile robot, $$R_p = \begin{cases} -0.3 & \text{if } v \approx 0 \\ +0.4 & \text{if } v \neq 0 \text{ and } w \neq 0 \\ +0.1 & \text{else} \end{cases},$$

where v is a linear velocity and w is an angular velocity.

Optionally, the laser radar monocular vision navigation model determination module may include:

a sample image determination unit, configured to label the monocular camera data according to the heading angle of the mobile robot at the same moment, to obtain a sample image.

Optionally, the laser radar monocular vision navigation model determination module may further include:

a first acquisition unit, configured to acquire a Resnet18 network and a pre-trained YOLO v3 network;

a laser radar monocular vision navigation model determination unit, configured to input the sample image to the Resnet18 network and the pre-trained YOLO v3 network, and merge a pedestrian information vector output by the pre-trained YOLO v3 network with a fully connected layer of the Resnet18 network to obtain a laser radar monocular vision navigation model.

According to the embodiments of the present disclosure, the present disclosure has the following technical effects:

The indoor monocular navigation method and system based on cross-sensor transfer learning according to the present disclosure obtains a stable autonomous navigation model by using a virtual single-line laser radar as a sensor in a simulation environment and based on a Deep Deterministic Policy Gradient (DDPG) reinforcement learning method, and binds real environment data collected by a single-line laser radar and a monocular camera frame by frame, labels in real time real environment data by using the autonomous navigation model and uses the labeled data set to further train a laser radar monocular vision navigation model, so that cross-sensor transfer learning from a simulation environment using only a laser radar to a real environment using only a monocular camera is achieved. Moreover, the navigation angle of the mobile robot carrying the monocular camera is acquired through monocular camera data, and navigation accuracy of the mobile robot carrying the monocular camera is further improved.

BRIEF DESCRIPTION OF THE DRAWINGS

In order to more clearly illustrate the technical solutions of the embodiments of the present disclosure and in the prior art, accompanying drawings used in the embodiments are described below. As a matter of course, the drawings described below are merely some embodiments of the invention; other drawings can be obtained according to these drawings without any inventive effort by those skilled in the art.

DETAILED DESCRIPTION OF PARTICULAR EMBODIMENTS

The technical solutions of the embodiments of the present disclosure will be clearly and completely described in connection with the accompanying drawings in the embodiments of the present disclosure. As a matter of course, the described embodiments are merely some embodiments of the present disclosure and not all embodiments. Based on the embodiments of the present disclosure, any other embodiment obtained by those skilled in the art without inventive effort shall fall within the scope of protection of the present invention.

An object of the present disclosure is to provide an indoor monocular navigation method based on cross-sensor transfer learning and a system thereof, to improve the accuracy of mobile robot navigation with a monocular camera.

To make the above objects, features and advantages of the present disclosure more comprehensible, a further detailed description of the present disclosure is provided below in conjunction with the accompanying drawings and embodiments.

Figure 1:
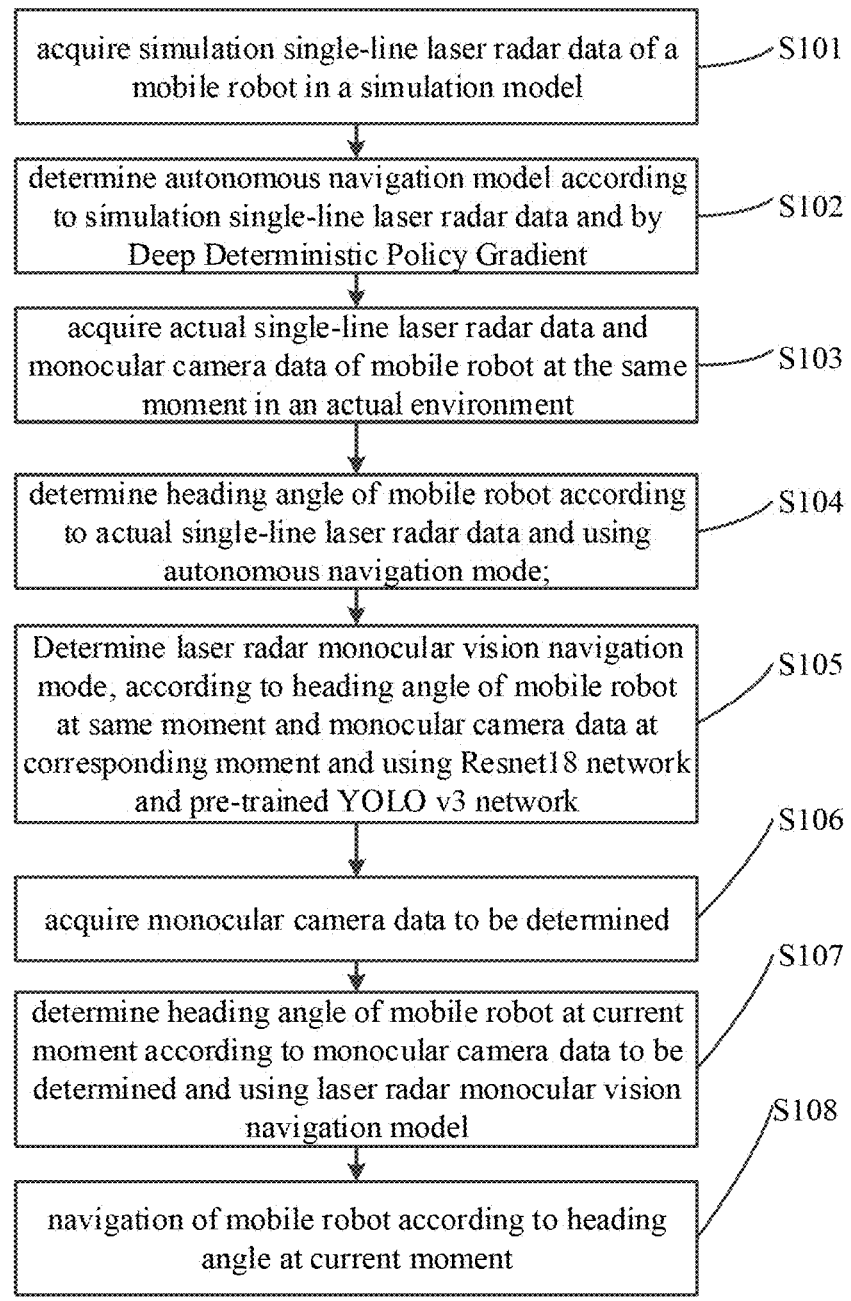
FIG. 1 is a flow chat of an indoor monocular navigation method based on cross-sensor transfer learning according to the present disclosure.
Figure 2:
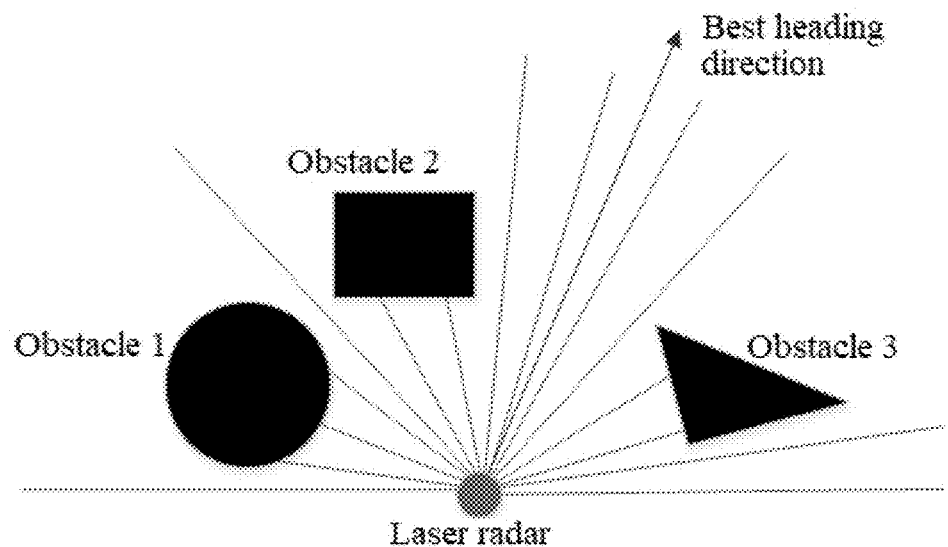
FIG. 2 is a schematic diagram of a single-line laser radar data.

FIG. 1 is a flow chat of an indoor monocular navigation method based on cross-sensor transfer learning according to the present disclosure. As shown in FIG. 1, the indoor monocular navigation method based on cross-sensor transfer learning according to the present disclosure includes:

S101, acquiring simulation single-line laser radar data of a mobile robot in a simulation model, where the simulation model is built in a Webots open source simulation environment; the mobile robot is a DJI Mavic Pro; the mobile robot is provided with an LMS 291 single-line laser radar; the simulation single-line laser radar data is a depth value. The single-line laser radar data is shown in FIG. 2.

S102, determining an autonomous navigation model according to the simulation single-line laser radar data and by using a deterministic policy gradient deep reinforcement learning method, where the autonomous navigation model takes the laser radar data as an input and outputs a heading angle of the mobile robot. The reinforcement learning method includes four factors: state space design, action space design, network design and reward function design.

1. State space design: state space is for the input states of the enhanced learning. The laser radar data is shown as the green beams in FIG. 2; the laser radar emits 180 beams in the range of 0-180 degrees, and a length value of the beams (the depth value) is returned. Here the data in the range of 0-180 degrees of the laser radar is sampled, at a sampling rate of once every 9 degrees. Thus, a new data array of the laser radar is formed, which has a length of 20. Then the laser radar data is shown in equation (1), where newLidarData is the new laser radar data, and $l_1, l_2, \ldots, l_{18}, l_{19}, l_{20}$ represent the 20 sampled laser radar data respectively. By substituting the new laser radar data for the enhanced learning state state, the equation (1) is obtained.

$$\text{state} = \text{newLidarData} = [l_1, l_2, \ldots, l_8, l_{19}, l_{20}] \quad (1)$$

2. Action space design: the output action space of the reinforcement learning policy is defined as a heading angle value in the range of 0-180 degrees, and is a continuous value.

Figure 3:
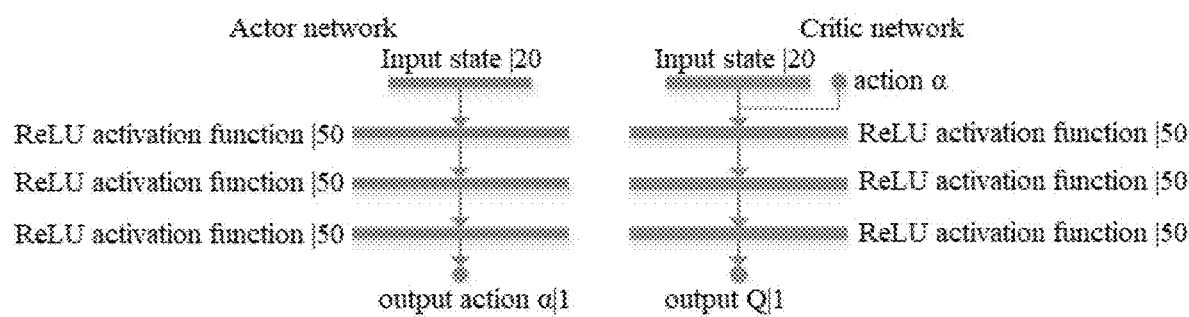
FIG. 3 is a structural diagram of an autonomous navigation model.

3. Network structure: a structural diagram is shown in FIG. 3, where the number following "|" represents the number of neurons in the current layer. The Deep Deterministic Policy Gradient (DDPG) algorithm is similar to a generative adversarial network, where there are two networks, one is the Actor, the other is the Critic. The Actor network takes a state as an input and outputs an action, the Critic is fed with the action a output by the Actor and a state and outputs a score Q for evaluating the action output by the Actor. The Actor network has a cost function as shown in equation (2), and the Critic network has a cost function as shown in equation (3). Equation (2) indicates that the goal of the Actor is to maximize the score of the Critic. Equation (3) is a classical temporal difference (TD) cost function, where r is an environmental reward; γ is a discount rate, which is a constant, normally 0.99. Meanwhile, Q(s'), Q(s) are the score Q values of the previous moment and the next moment respectively.

$$\text{actor\_loss}=-Q \qquad (2)$$

$$\text{critic\_loss}=r+\gamma \cdot Q(s')-Q(s)$$

4. Reward function: $R=-k \cdot d_{min}^{-1}+R_p$ is used for determining a reward function, where R is the reward function; k is a constant, with a value of 0.5; $d_{min}$ is a safety margin of the current mobile robot; $R_p$ is a dynamic performance excitation item for the current mobile robot, $$R_p = \begin{cases} -0.3 & \text{if } v \approx 0 \\ +0.4 & \text{if } v \neq 0 \text{ and } w \neq 0 \\ +0.1 & \text{else} \end{cases},$$

where v is a linear velocity and w is an angular velocity.

dmin is the minimum value in the 20 laser radar data in equation (1), representing a safety margin of the current mobile robot.

The reward function includes two parts: 1. Collision penalty. When the mobile robot collides, a penalty of −100 may directly be given to the mobile robot; this kind of penalty would work but also result in a drastic change in the reward function numerical value, which is bad for the fitting of the neural network and the smoothness of the policy decision. Therefore, the reward function is designed to have a form of $-k \cdot d_{min}^{-1}$, $-k \cdot d_{min}^{-1}$ means that the farther away the mobile robot is from all obstacles, the smaller the penalty is; therefore, this item can penalize the collision of the mobile robot, while exciting the mobile robot to fly to the middle of the road as much as possible, resulting in a larger safety margin. In addition, the form of $-k \cdot d_{min}^{-1}$ makes the penalty function of collision of the mobile robot to be a continuous function, so that the neural network is easier to fit, and the smoothness of the policy decision is increased. 2. Excitation of the dynamic performance of the mobile robot. This part combines the angular velocity and linear velocity of the mobile robot into a piecewise function, without a large difference in function value between the pieces, thereby avoiding increasing the difficulty of the fitting of the neural network.

According to the first term in the equation for $R_p$, a lower decision linear velocity v of the mobile robot indicates that the mobile robot is likely to be stationary or moving around in the same place, and therefore a penalty is given. According to the second term, when neither of the linear velocity v and the angular velocity w of the mobile robot is 0, the mobile robot is roaming as expected in a building and alive, and therefore a certain reward is given. According to the third term, when the linear velocity of the mobile robot v is not zero and a yaw angular velocity w is 0, a positive excitation of 0.1 is given for the purpose of exciting the mobile robot to actively roam. It should be noted that in general, the numerical priorities are $|k \cdot d_{min}^{-1}|>0.4>0.3>0.1$, which means that the priorities of sub-tasks are: collision avoidance>active roaming. This priority setting ensures that the mobile robot can actively roam in the building with a maximum safety margin while stably avoiding obstacles, thereby greatly improving the "survival" time of the mobile robot.

In a specific embodiment, the configuration of the computer is GPU 1080 Ti; and with CPU 178700K, it takes approximately 4 hours of training for the policy to tend to be stable.

S103, acquiring actual single-line laser radar data and monocular camera data of the mobile robot at the same moment in an actual environment. A single-line laser radar and a monocular camera are fixed together, and the fixed equipment is used for collecting the actual single-line laser radar data and the monocular camera data at the same moment. The collected data set is in a format of (image, lidarData), where image and lidarData are image collected by the camera and data collected by the laser radar at the same moment, the image has a size of 640*480, and a RGB format.

S104, determining a heading angle of the mobile robot according to the actual single-line laser radar data and by using the autonomous navigation model.

Specifically, the determination process includes:

determining a heading angle of the mobile robot according to the formula $$\text{direction}_n=mid(\max(\text{lidarData\_blank})_n),$$

where $\max(\text{lidarData\_blank})_n$ represents a region having the largest area that is continuous and blank at moment $t_n$ in the coverage of the single-line laser radar, n=1, 2, L.

$mid(\max(\text{lidarData\_blank})_n)$ represents finding a central heading angle of the region $\max(\text{lidarData\_blank})_n$; and the found $mid(\max(\text{lidarData\_blank})_n)$ is used as the heading angle of the mobile robot, $\text{direction}_n$, at moment $t_n$.

Figure 4:
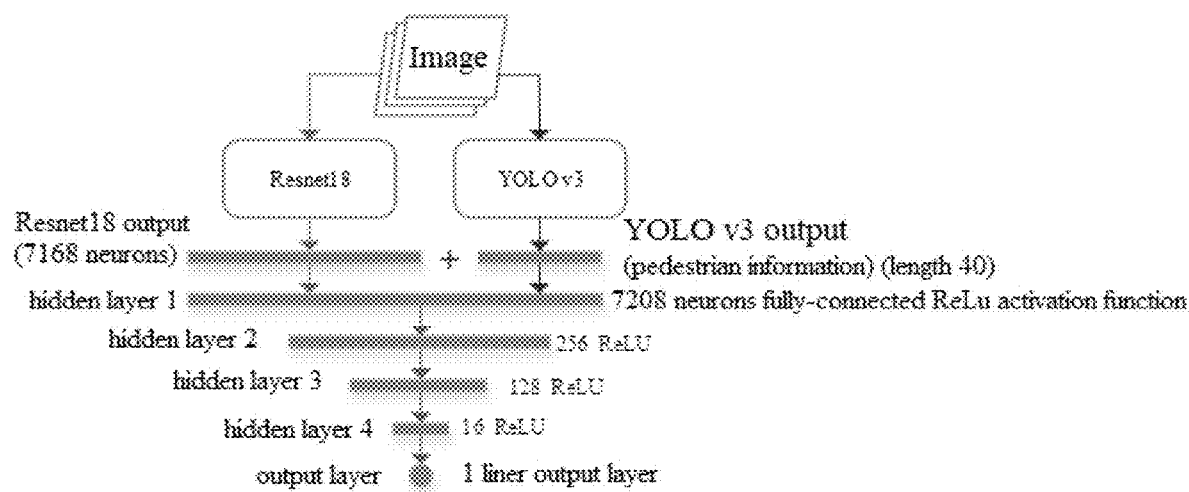
FIG. 4 is a structural diagram of a laser radar monocular vision navigation model.

S105, determining a laser radar monocular vision navigation model, according to the heading angle of the mobile robot at the same moment and monocular camera data at a corresponding moment and by using a Resnet18 network and a pre-trained YOLO v3 network. The laser radar monocular vision navigation model takes the monocular camera data as an input, and outputs a heading angle at a corresponding moment.

labeling the monocular camera data according to the heading angle of the mobile robot at the same moment, to obtain sample images, where the format is (image, direction) and direction is the heading angle;

acquiring a Resnet18 network and a pre-trained YOLO v3 network:

inputting sample images to the Resnet18 network and the pre-trained YOLO v3 network; merging pedestrian information vectors output by the pre-trained YOLO v3 network with a fully connected layer of the Resnet18 network, to obtain a laser radar monocular vision navigation model, as shown in FIG. 4.

Specifically, the outputting pedestrian information vectors by the pre-trained YOLO v3 network includes:

$\text{person}_n=(x_{t1}, y_{t1}, x_{b1}, y_{b1}, x_{t2}, y_{b2}, \ldots x_{ti}, y_{ti}, x_{bi}, y_{bi}, \ldots x_{tI}, y_{tI}, x_{bI}, y_{bI})$, where $(x_{ti}, y_{ti}, x_{bi}, y_{bi})$ represents the coordinates of a top left corner and the coordinates of a bottom right corner of a i-th pedestrian prediction frame in the image at moment $t_n$, i=1, 2, L, I, where I is the total number of pedestrians in the image at moment $t_n$, and $\text{person}_n$ is a set composed of the coordinates of top left corners and bottom right corners of all the pedestrian prediction frames in the image at moment $t_n$.

The laser radar monocular vision navigation model includes a Resnet18 network, a trained YOLO v3 network, hidden layers 1-4 and an output layer, where the number of neurons of the Resnet18 network is 7168, the number of pedestrian information output by the trained YOLO v3 network is 40, the numbers of neurons of the hidden layer 1, the hidden layer 2, the hidden layer 3, the hidden layer 4 and the output layer are 7208, 256, 128, 16 and 1 respectively.

The hidden layers 1-4 of the laser radar monocular vision navigation model uses a ReLU activation function; and the output layer uses a linear activation function.

The cost function of the laser radar monocular vision navigation model uses mean square error, and the cost function can be expressed as equation (3):

$$\text{Loss} = \frac{1}{m}\sum_{j=1}^{m}(y_j - \hat{y}_j)^2$$

where Loss represents the cost function, $y_j$ represents an output result of the laser radar monocular vision navigation model that corresponds to a j-th sample image, $\hat{y}_j$ represents a heading angle corresponding to the j-th sample image, and m represents the number of sample images in one batch.

S106, acquiring monocular camera data to be determined.

S107, determining a heading angle of the mobile robot at a current moment, according to the monocular camera data to be determined and by using the laser radar monocular vision navigation model.

S108, performing navigation of the mobile robot according to the heading angle at the current moment.

Figure 5:
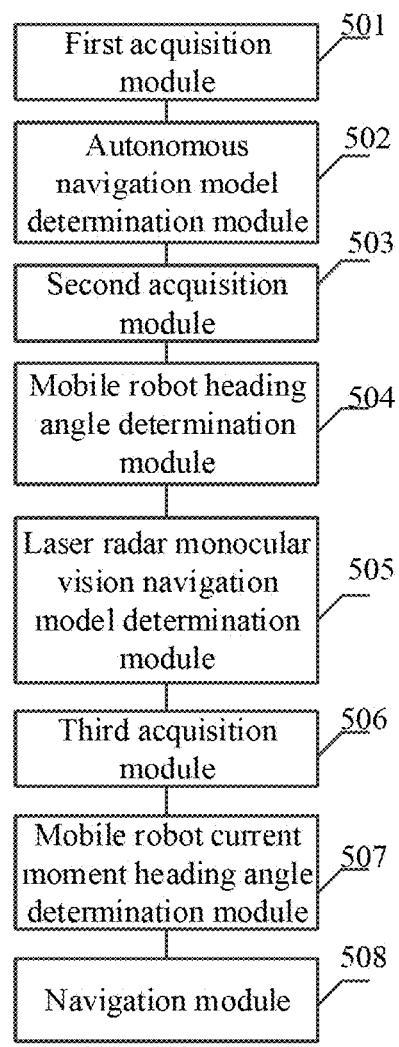
FIG. 5 is a structural diagram of an indoor monocular navigation system based on cross-sensor transfer learning according to the present disclosure.

FIG. 5 is a structural diagram of an indoor monocular navigation system based on cross-sensor transfer learning according to the present disclosure. As shown in FIG. 5, the indoor monocular navigation system based on cross-sensor transfer learning according to the present disclosure includes: a first acquisition module 501, an autonomous navigation model determination module 502, a second acquisition module 503, a mobile robot heading angle determination module 504, a laser radar monocular vision navigation model determination module 505, a third acquisition module 506, a mobile robot current moment heading angle determination module 507 and a navigation module 508.

The first acquisition module 501 is configured to acquire simulation single-line laser radar data of a mobile robot in a simulation model, where the simulation model is built in a Webots open source simulation environment; the mobile robot is a DJI Mavic Pro; the mobile robot is provided with an LMS 291 single-line laser radar; the simulation single-line laser radar data is a depth value;

The autonomous navigation model determination module 502 is configured to determine an autonomous navigation model according to the simulation single-line laser radar data and by using a deterministic policy gradient deep reinforcement learning method, where the autonomous navigation model takes the laser radar data as an input and outputs a heading angle of the mobile robot.

The second acquisition module 503 is configured to acquire actual single-line laser radar data and monocular camera data of the mobile robot at the same moment in an actual environment.

The heading angle determination module 504 is configured to determine a heading angle of the mobile robot according to the actual single-line laser radar data and by using the autonomous navigation model.

The laser radar monocular vision navigation model determination module 505 is configured to determine a laser radar monocular vision navigation model, according to the heading angle of the mobile robot at the same moment and monocular camera data at a corresponding moment and by using a Resnet18 network and a pre-trained YOLO v3 network, where the laser radar monocular vision navigation model takes the monocular camera data as an input, and outputs a heading angle at a corresponding moment.

The third acquisition module 506 is configured to acquire monocular camera data to be determined.

The mobile robot current moment heading angle determination module 507 is configured to determine a heading angle of the mobile robot at a current moment, according to the monocular camera data to be determined and by using the laser radar monocular vision navigation model.

The navigation module 508 is configured to perform navigation of the mobile robot according to the heading angle at the current moment.

Specifically, the autonomous navigation model determination module 502 may include: a reward function determination unit.

The reward function determining unit is configured to determine a reward function by using $R = -k \cdot d_{min}^{-1} + R_p$, where R is the reward function; k is a constant, with a value of 0.5; $d_{min}$ is a safety margin of the current mobile robot; $R_p$ is a dynamic performance excitation item for the current mobile robot, $$R_p = \begin{cases} -0.3 & \text{if } v \approx 0 \\ +0.4 & \text{if } v \neq 0 \text{ and } w \neq 0 \\ +0.1 & \text{else} \end{cases}$$

where v is a linear velocity and w is an angular velocity.

Specifically, the laser radar monocular vision navigation model determination module 505 may include: a sample image determination unit, a first acquisition unit and a laser radar monocular vision navigation model determination unit.

The sample image determination unit is configured to label the monocular camera data according to the heading angle of the mobile robot at the same moment, to obtain a sample image.

The first acquisition unit is configured to acquire a Resnet18 network and a pre-trained YOLO v3 network.

The laser radar monocular vision navigation model determination unit is configured to input the sample image to the Resnet18 network and the pre-trained YOLO v3 network, and merge a pedestrian information vector output by the pre-trained YOLO v3 network with a fully connected layer of the Resnet18 network to obtain a laser radar monocular vision navigation model.

The embodiments of the present specification are described in a progressive manner, each of which is specifically illustrated as being different from the other embodiments; and the same or like parts between the various embodiments are referenced to one another. System embodiments of the present disclosure correspond to the method embodiments, therefore detailed description is omitted and please refer to the corresponding parts in the method embodiments.

The specific embodiments described herein are for illustrative purposes only, for a better understanding of the idea of the present disclosure. Those skilled in the art can make modifications to the implementations and applications of the present disclosure based on the idea of the present disclosure. In conclusion, the specification shall not be construed as limiting the scope of the present invention.

What is claimed is:

1. An indoor monocular navigation method based on cross-sensor transfer learning, comprising:

acquiring simulation single-line laser radar data of a mobile robot in a simulation model, where the simulation model is built in an open source simulation environment; the mobile robot is provided with a single-line laser radar; the simulation single-line laser radar data is a depth value;

determining an autonomous navigation model according to the simulation single-line laser radar data and by using a deterministic policy gradient deep reinforcement learning method, where the autonomous navigation model takes the laser radar data as an input and outputs a heading angle of the mobile robot;

acquiring actual single-line laser radar data and monocular camera data of the mobile robot at the same moment in an actual environment;

determining a heading angle of the mobile robot according to the actual single-line laser radar data and by using the autonomous navigation model;

determining a laser radar monocular vision navigation model, according to the heading angle of the mobile robot at the same moment and monocular camera data at a corresponding moment and by using a Resnet18 network and a pre-trained YOLO v3 network, where the laser radar monocular vision navigation model takes the monocular camera data as an input, and outputs a heading angle at a corresponding moment;

acquiring monocular camera data to be determined;

determining a heading angle of the mobile robot at a current moment, according to the monocular camera data to be determined and by using the laser radar monocular vision navigation model;

performing navigation of the mobile robot according to the heading angle at the current moment.

2. The indoor monocular navigation method based on cross-sensor transfer learning according to claim 1, wherein the determining an autonomous navigation model according to the simulation single-line laser radar data and by using a deterministic policy gradient deep reinforcement learning method comprises:

using $R=-k \cdot d_{min}^{-1}+R_p$ for determining a reward function, where R is the reward function; k is a constant, with a value of 0.5; $d_{min}$ is a safety margin of the current mobile robot; $R_p$ is a dynamic performance excitation item for the current mobile robot, $$R_p = \begin{cases} -0.3 & \text{if } v \approx 0 \\ +0.4 & \text{if } v \neq 0 \text{ and } w \neq 0 \\ +0.1 & \text{else} \end{cases},$$

where v is a linear velocity and w is an angular velocity.

3. The indoor monocular navigation method based on cross-sensor transfer learning according to claim 1, wherein the determining a laser radar monocular vision navigation model, according to the heading angle of the mobile robot at the same moment and monocular camera data at a corresponding moment and by using a Resnet18 network and a pre-trained YOLO v3 network comprises:

labeling the monocular camera data according to the heading angle of the mobile robot at the same moment, to obtain a sample image.

4. The indoor monocular navigation method based on cross-sensor transfer learning according to claim 3, wherein the determining a laser radar monocular vision navigation model, according to the heading angle of the mobile robot at the same moment and monocular camera data at a corresponding moment and by using a Resnet18 network and a pre-trained YOLO v3 network further comprises:

acquiring a Resnet18 network and a pre-trained YOLO v3 network;

inputting the sample image to the Resnet18 network and the pre-trained YOLO v3 network; merging pedestrian information vectors output by the pre-trained YOLO v3 network with a fully connected layer of the Resnet18 network, to obtain a laser radar monocular vision navigation model.

5. An indoor monocular navigation system based on cross-sensor transfer learning, comprising:

a first acquisition module, configured to acquire simulation single-line laser radar data of a mobile robot in a simulation model, where the simulation model is built in an open source simulation environment; the mobile robot is provided with a single-line laser radar; the simulation single-line laser radar data is a depth value;

an autonomous navigation model determination module, configured to determine an autonomous navigation model according to the simulation single-line laser radar data and by using a deterministic policy gradient deep reinforcement learning method, where the autonomous navigation model takes the laser radar data as an input and outputs a heading angle of the mobile robot;

a second acquisition module, configured to acquire actual single-line laser radar data and monocular camera data of the mobile robot at the same moment in an actual environment;

a mobile robot heading angle determination module, configured to determine a heading angle of the mobile robot according to the actual single-line laser radar data and by using the autonomous navigation model;

a laser radar monocular vision navigation model determination module, configured to determine a laser radar monocular vision navigation model, according to the heading angle of the mobile robot at the same moment and monocular camera data at a corresponding moment and by using a Resnet18 network and a pre-trained YOLO v3 network, where the laser radar monocular vision navigation model takes the monocular camera data as an input, and outputs a heading angle at a corresponding moment;

a third acquisition module, configured to acquire monocular camera data to be determined;

a mobile robot current moment heading angle determination module, configured to determine a heading angle of the mobile robot at a current moment, according to the monocular camera data to be determined and by using the laser radar monocular vision navigation model;

a navigation module, configured to perform navigation of the mobile robot according to the heading angle at the current moment.

6. The indoor monocular navigation system based on cross-sensor transfer learning according to claim 5, wherein the autonomous navigation model determination module comprises:

a reward function determination unit, configured to determine a reward function by using $R=-k \cdot d_{min}^{-1}+R_p$, where R is the reward function; k is a constant, with a value of 0.5; $d_{min}$ is a safety margin of the current mobile robot; $R_p$ is a dynamic performance excitation item for the current mobile robot, $$R_p = \begin{cases} -0.3 & \text{if } v \approx 0 \\ +0.4 & \text{if } v \neq 0 \text{ and } w \neq 0 \\ +0.1 & \text{else} \end{cases}$$

where v is a linear velocity and w is an angular velocity.

7. The indoor monocular navigation system based on cross-sensor transfer learning according to claim 5, wherein the laser radar monocular vision navigation model determination module comprises:
   a sample image determination unit, configured to label the monocular camera data according to the heading angle of the mobile robot at the same moment, to obtain a sample image.

8. The indoor monocular navigation system based on cross-sensor transfer learning according to claim 7, wherein the laser radar monocular vision navigation model determination module further comprises:
   a first acquisition unit, configured to acquire a Resnet18 network and a pre-trained YOLO v3 network;
   a laser radar monocular vision navigation model determination unit, configured to input the sample image to the Resnet18 network and the pre-trained YOLO v3 network, and merge a pedestrian information vector output by the pre-trained YOLO v3 network with a fully connected layer of the Resnet18 network to obtain a laser radar monocular vision navigation model.

\* \* \* \* \*